(12) United States Patent
Doi et al.

(10) Patent No.: US 11,373,053 B2
(45) Date of Patent: Jun. 28, 2022

(54) CODE INFORMATION READING DEVICE, METHOD, AND COMPUTER-READABLE STORAGE MEDIUM

(71) Applicant: FUJITSU LIMITED, Kawasaki (JP)

(72) Inventors: Kazumi Doi, Fukuoka (JP); Masahiro Kihara, Fukuoka (JP); Masayoshi Nakashima, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/596,973

(22) Filed: Oct. 9, 2019

(65) Prior Publication Data

US 2020/0117871 A1 Apr. 16, 2020

(30) Foreign Application Priority Data

Oct. 15, 2018 (JP) .............................. JP2018-194635

(51) Int. Cl.
*G06K 7/14* (2006.01)

(52) U.S. Cl.
CPC ......... *G06K 7/1443* (2013.01); *G06K 7/1417* (2013.01); *G06K 7/1447* (2013.01); *G06K 7/1456* (2013.01)

(58) Field of Classification Search
CPC .. G06K 7/1443; G06K 7/1417; G06K 7/1447; G06K 7/1456
See application file for complete search history.

(56) References Cited

U.S. PATENT DOCUMENTS

| 8,340,498 | B1* | 12/2012 | Gill | G11B 27/28 386/241 |
|---|---|---|---|---|
| 2010/0155464 | A1 | 6/2010 | Swayn | |
| 2011/0007967 | A1 | 1/2011 | Soederberg et al. | |
| 2013/0004076 | A1* | 1/2013 | Koo | G06K 9/6292 382/176 |

(Continued)

FOREIGN PATENT DOCUMENTS

| JP | 9-185671 A | 7/1997 |
|---|---|---|
| JP | 2007-72726 A | 3/2007 |

(Continued)

OTHER PUBLICATIONS

USPTO—Ellis—Non-Final Office Action dated Aug. 20, 2020 for related U.S. Appl. No. 16/597,300 [pending].

(Continued)

*Primary Examiner* — Thien M Le
*Assistant Examiner* — Asifa Habib
(74) *Attorney, Agent, or Firm* — Fujitsu Patent Center

(57) ABSTRACT

A recognition section detects code information from each of plural frames included in video image data and recognizes the code information. A determination section determines that a recognition result recognized by the recognition section is valid in at least one scenario out of a scenario in which at least part of the recognition result matches a predetermined character, or a scenario in which a number of characters in the recognition result matches a predetermined number, or a scenario in which the same recognition result is recognized in two or more consecutive frames. An output section employs a recognition result determined to be valid by the determination section to output a reading result for the code information.

6 Claims, 11 Drawing Sheets

| FRAME NUMBER | 1 | 2 | 3 | 4 | 5 |
|---|---|---|---|---|---|
| RECOGNITION RESULT | abcde | abdg | No recognition result | abcde | abcde |
| STARTING CHARACTER STRING | VALID | INVALID | INVALID | VALID | VALID |
| NUMBER OF CHARACTERS | VALID | INVALID | INVALID | VALID | VALID |
| NUMBER OF CONSECUTIVE APPEARANCES | abcde = 1 | abdg = 1 CLEAR abcde | CLEAR abdg | abcde = 1 | abcde = 2 |
| READING RESULT (PATTERN 1) | N/A | N/A | N/A | N/A | abcde |
| READING RESULT (PATTERN 2) | abcde | N/A | N/A | abcde | abcde |

(56) References Cited

U.S. PATENT DOCUMENTS

| | | |
|---|---|---|
| 2013/0292473 A1 | 11/2013 | Soederberg et al. |
| 2015/0199589 A1 | 7/2015 | Suzuki |
| 2017/0061185 A1 | 3/2017 | Wang et al. |
| 2020/0117864 A1 | 4/2020 | Doi et al. |
| 2020/0349666 A1* | 11/2020 | Hodge ................. G08G 1/0133 |

FOREIGN PATENT DOCUMENTS

| | | |
|---|---|---|
| JP | 2010-170539 A | 8/2010 |
| JP | 2011-513809 A | 4/2011 |
| JP | 2015-84230 A | 4/2015 |

OTHER PUBLICATIONS

USPTO—Non-Final Office Action of related U.S. Appl. No. 16/597,300 dated Mar. 23, 2021 [pending].

USPTO—Ellis—Notice of Allowance dated Dec. 11, 2020 for related U.S. Appl. No. 16/597,300 [allowed].

USPTO—Notice of Allowance dated Jul. 28, 2021 for related U.S. Appl. No. 16/597,300 [pending].

USPTO—Supplemental Notice of Allowance dated Aug. 10, 2021 for related U.S. Appl. No. 16/597,300 [pending].

* cited by examiner

FIG.3

| FRAME NUMBER | 1 | 2 | 3 | 4 | 5 |
|---|---|---|---|---|---|
| RECOGNITION RESULT | abcde | abdg | No recognition result | abcde | abcde |
| STARTING CHARACTER STRING | VALID | INVALID | INVALID | VALID | VALID |
| NUMBER OF CHARACTERS | VALID | INVALID | INVALID | VALID | VALID |
| NUMBER OF CONSECUTIVE APPEARANCES | abcde = 1 | abdg = 1 CLEAR abcde | CLEAR abdg | abcde = 1 | abcde = 2 |
| READING RESULT (PATTERN 1) | N/A | N/A | N/A | N/A | abcde |
| READING RESULT (PATTERN 2) | abcde | N/A | N/A | abcde | abcde |

P ↙  Q ↙

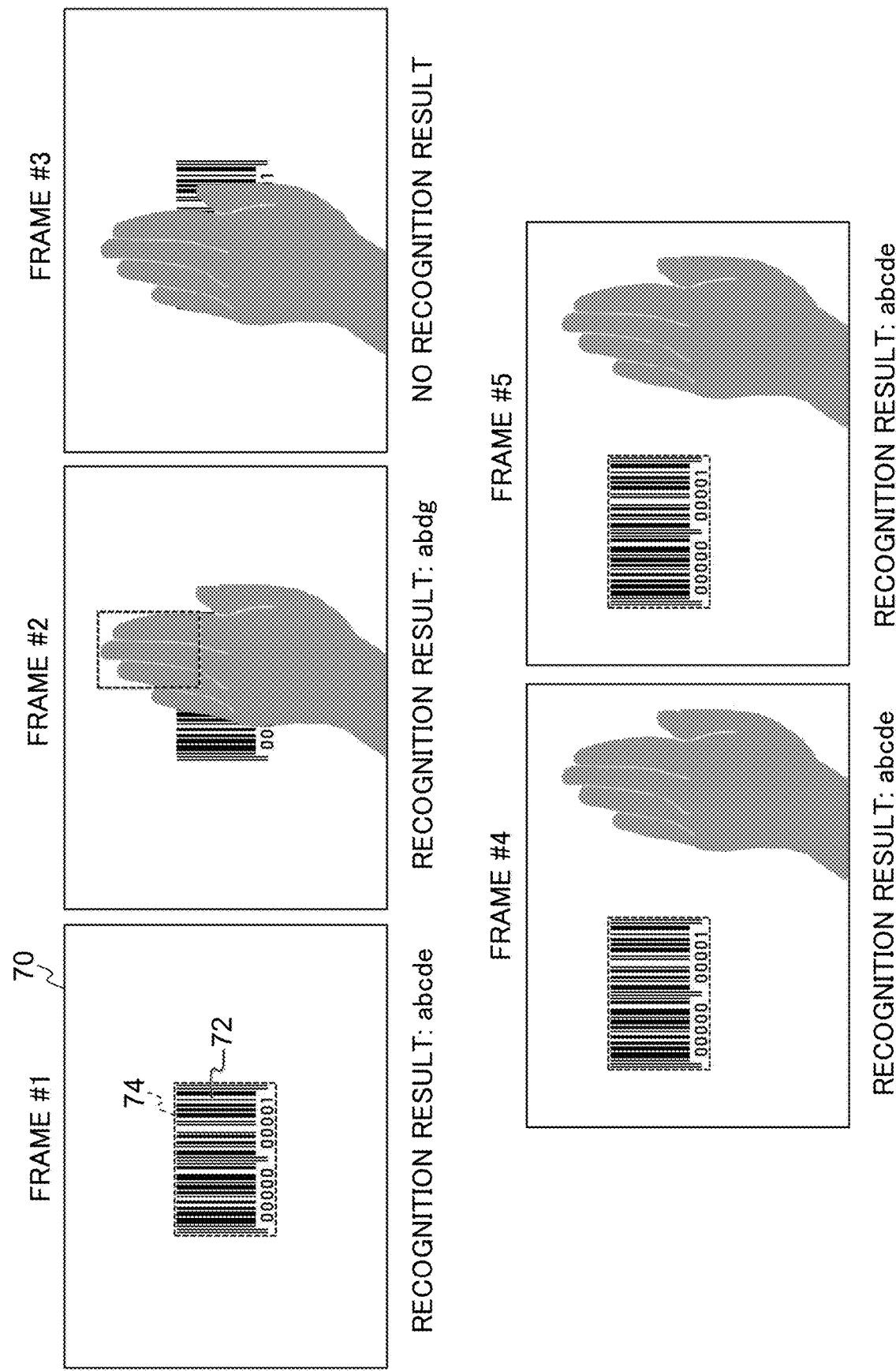

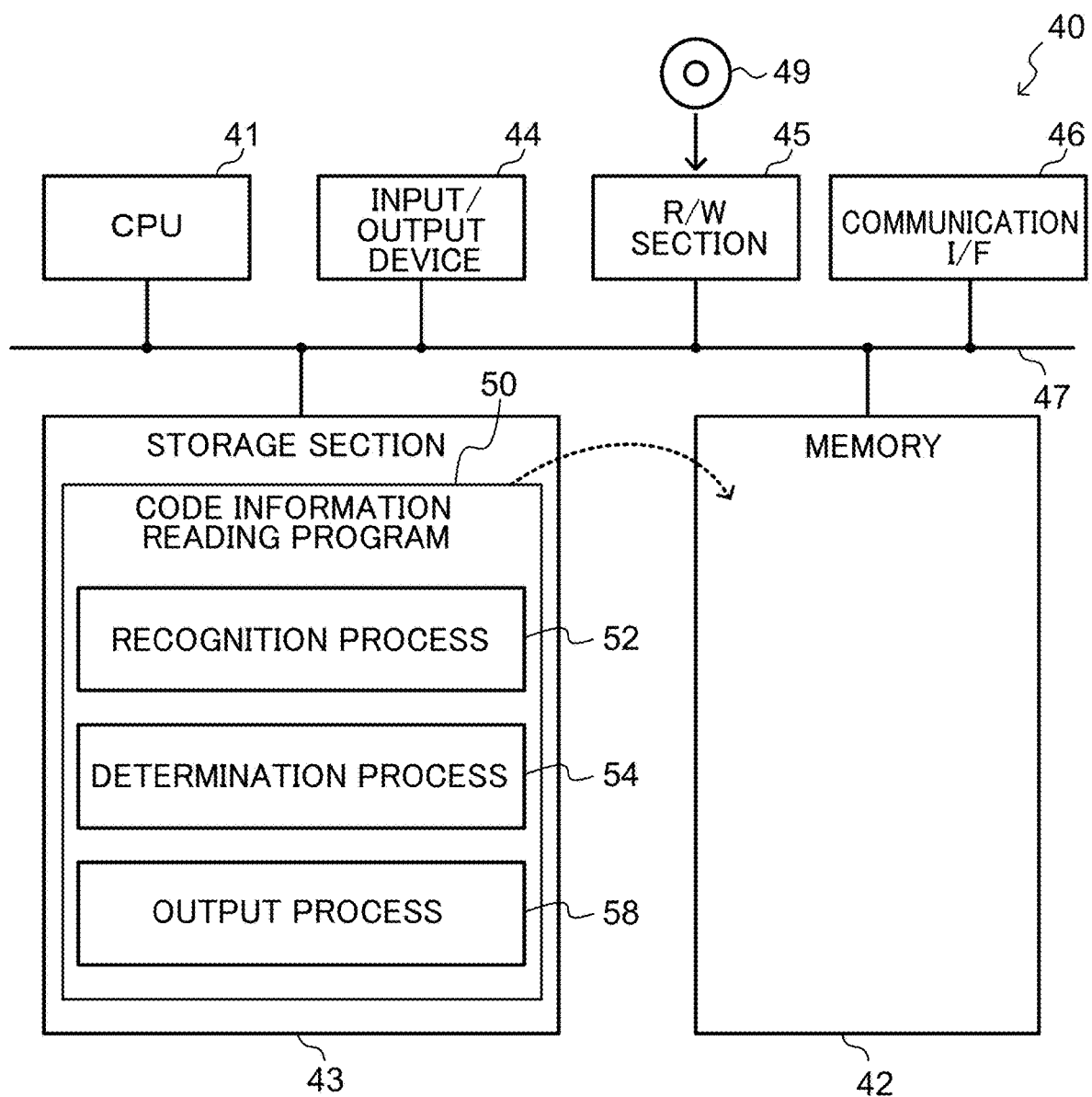

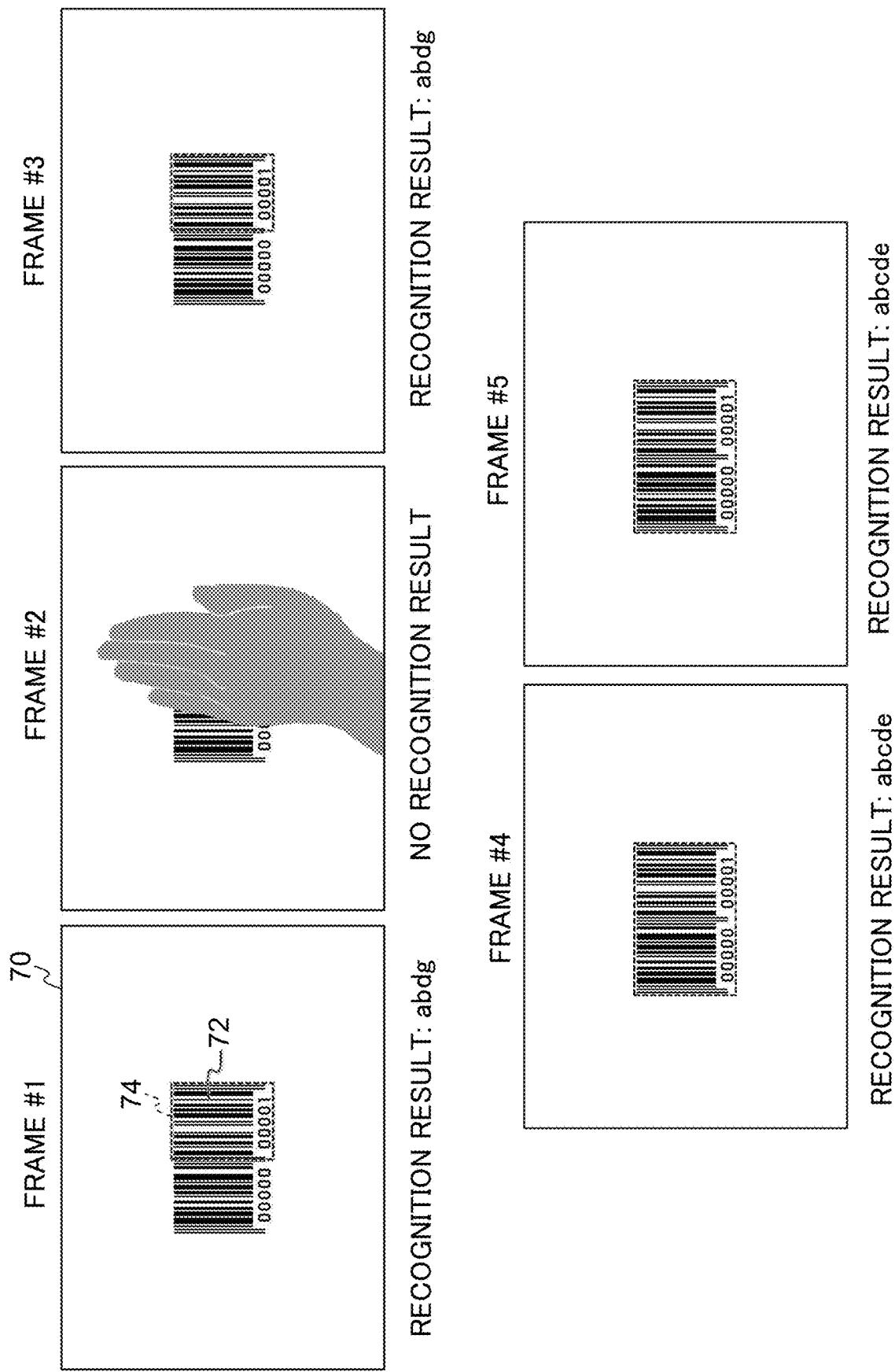

FIG.9

| FRAME NUMBER | 1 | 2 | 3 | 4 | 5 |
|---|---|---|---|---|---|
| RECOGNITION RESULT | abdg | NO RECOGNITION RESULT | abdg | abcde | abcde |
| STARTING CHARACTER STRING | INVALID | INVALID | INVALID | VALID | VALID |
| NUMBER OF CHARACTERS | INVALID | INVALID | INVALID | VALID | VALID |
| NUMBER OF CONSECUTIVE APPEARANCES | abdg = 1 | CLEAR abdg | abdg = 1 | abcde = 1 | abcde = 2 |
| READING RESULT (PATTERN 1) | N/A | N/A | N/A | N/A | abcde |
| DEGREE OF CONFIDENCE IN READING RESULT CANDIDATE | – | – | – | – | abcde = 1/1 |
| DEGREE OF CONFIDENCE IN RECOGNITION RESULT CANDIDATE | abdg = 1/1 | abdg = 1/1 | abdg = 2/2 | abcde = 1/3 abdg = 2/3 | abcde = 2/4 abdg = 2/4 |

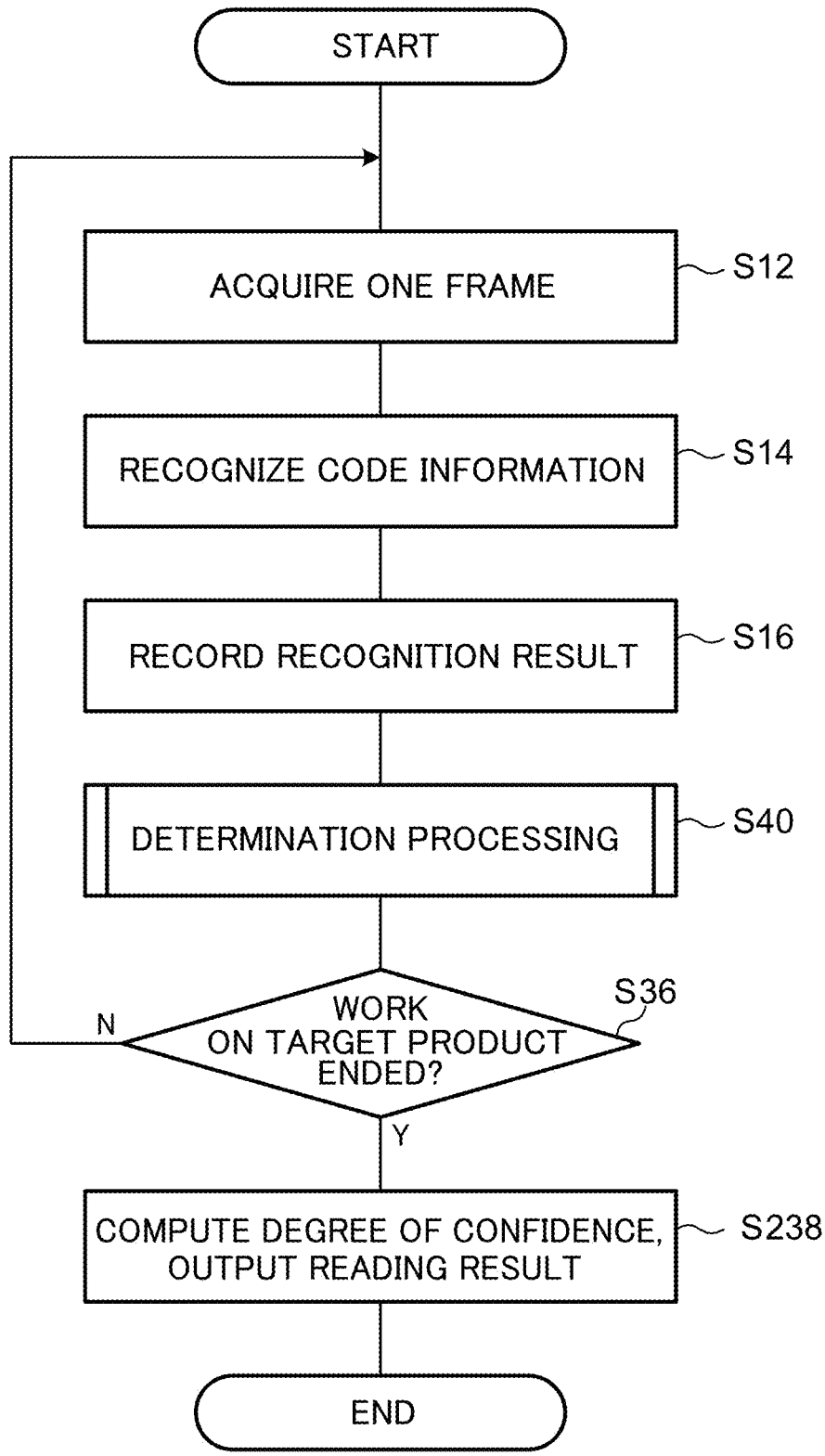

CODE INFORMATION READING DEVICE, METHOD, AND COMPUTER-READABLE STORAGE MEDIUM

CROSS-REFERENCE TO RELATED APPLICATION

This application is based upon and claims the benefit of priority of the prior Japanese Patent Application No. 2018-194635, filed on Oct. 15, 2018, the entire content of which is incorporated herein by reference.

FIELD

Technology disclosed herein relates to a code information reading device, a code information reading method, and a computer-readable storage medium storing a code information reading program.

BACKGROUND

In factories where products are manufactured, for example, it is desirable to make products and components traceable up to the point of consumption or disposal in order to prevent errors in product shipping and to ensure the traceability of incorporated components. In order to trace such products and components, code information such as a bar code or a QR code (registered trademark) applied to cardboard packaging, products, components, or the like is read when the products or components are being shipped or received, or on site in a manufacturing line.

A method for reading information included in a bar code has been proposed as technology relating to reading of code information. This method includes a process of detecting the presence of a bar code in a first image in which a first region is captured at a first image quality. The method also includes a process in which, in cases in which the presence of a bar code has been detected, a second image capturing a second region is acquired at a second image quality. The second image quality is higher than the first image quality, and the second region at least partially overlaps the first region. The method also includes a process of decoding the bar code based on the second image in order to read information.

Technology has also been proposed to accurately recognize a bar code label affixed to a moving object, even in cases in which the direction in which the bar code label will pass by is not specified. In this technology, images gathered from plural multi-camera units installed above a conveyor belt for moving the moving object with the bar code label attached are sent to a bar code recognition device. In the bar code recognition device, input images are filtered to extract a bar code using the images gathered from the multi-camera units. The angle of the extracted bar code is then detected, feature values of the bar code are extracted according to the detected angle, and the bar code is recognized based on the extracted feature values.

RELATED PATENT DOCUMENTS

Patent Document 1 Japanese National-Phase Publication No. 2011-513809

Patent Document 2 Japanese Patent Application Laid-Open (JP-A) No. H09-185671

Under current methods, a worker manually reads each bar code or QR code (registered trademark) one at a time using a handheld code reader at sites where the above-described tracing of products or components is needed. In such cases, the worker needs to temporarily halt their primary task, such as receiving or assembling products, in order to pick up the code reader and read the bar code or QR code (registered trademark). This leads to a reduction in the efficiency of the primary task.

Alternatively, as in the related art described above, there are also fixed bar code readers that are installed on a conveyor belt and read the bar code at the timing when the product passes by, for example. Such bar code readers are often employed at product shipping sites and the like. Installed bar code readers have wider imaging distance and range capabilities than general handheld bar code readers, capture single shot (single frame) images, for example at hardware-based interrupt timings, recognize a bar code, and output a result.

In order to read the bar code or QR code (registered trademark) from the captured single shot image, the bar code or QR code (registered trademark) needs to be in a recognizable state at the timing of image capture by the camera. Namely, the image needs to be captured in a state in which an image of the worker, a shadow, or the like do not get in the way of the bar code or QR code (registered trademark) to be recognized.

SUMMARY

This one aspect of the technology disclosed herein is a code information reading device including a memory and a processor that is connected to the memory and that: detects code information from each of plural frames included in video image data and to recognize the code information; determines whether or not a recognition result of the recognized code information is valid based on a characteristic of the recognition result; and employs the recognition result when determined to be valid to output a reading result for the code information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating an example of a record table of the first exemplary embodiment;

FIG. 4 is a diagram illustrating examples of detection results and recognition results for code information for plural frames;

FIG. 5 is a block diagram illustrating a schematic configuration of a computer functioning as a code information reading device according to the first exemplary embodiment;

FIG. 8 is a diagram illustrating examples of detection results and recognition results for code information for plural frames;

FIG. 9 is a diagram illustrating an example of a record table of the second exemplary embodiment;

FIG. 11 is a flowchart illustrating an example of code information reading processing according to the second exemplary embodiment.

DESCRIPTION OF EMBODIMENTS

Explanation follows regarding exemplary embodiments of technology disclosed herein, with reference to the drawings.

First Exemplary Embodiment

Figure 1:
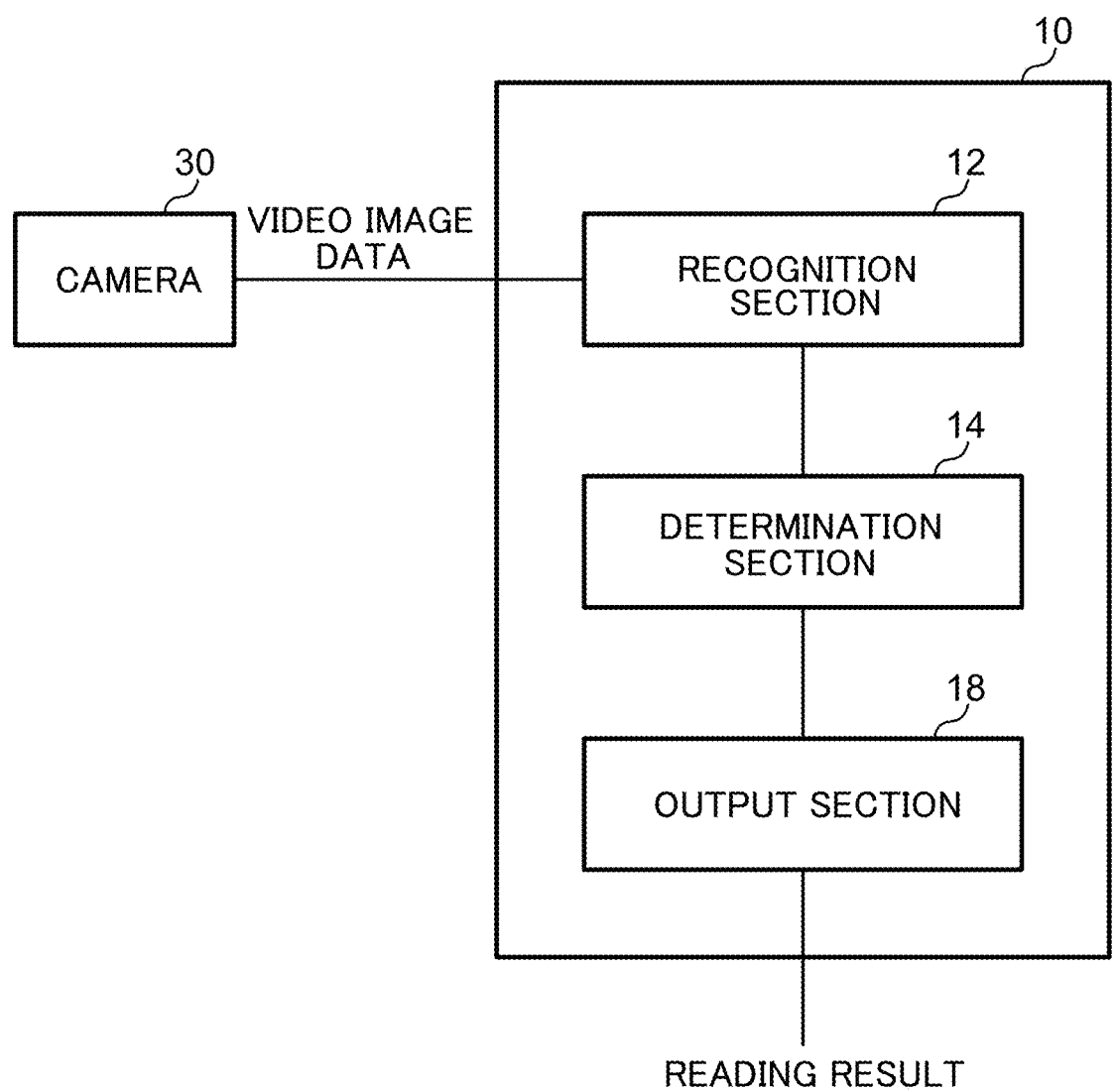
FIG. 1 is a functional block diagram illustrating a code information reading device according to a first exemplary embodiment.

As illustrated in FIG. 1, a code information reading device to according to a first exemplary embodiment acquires video image data captured by a camera 30, reads code information such as a bar code or a QR code (registered trademark) from the acquired video image data, and outputs a reading result.

For example, the camera 30 is installed on an assembly line or a flow line for receiving or shipping work target products that have been applied with code information. The camera 30 continuously captures a video image of a region where a worker is working on the products, and outputs video image data.

In terms of functionality, the code information reading device 10 includes a recognition section 12, a determination section 14, and an output section 18.

Figure 2:
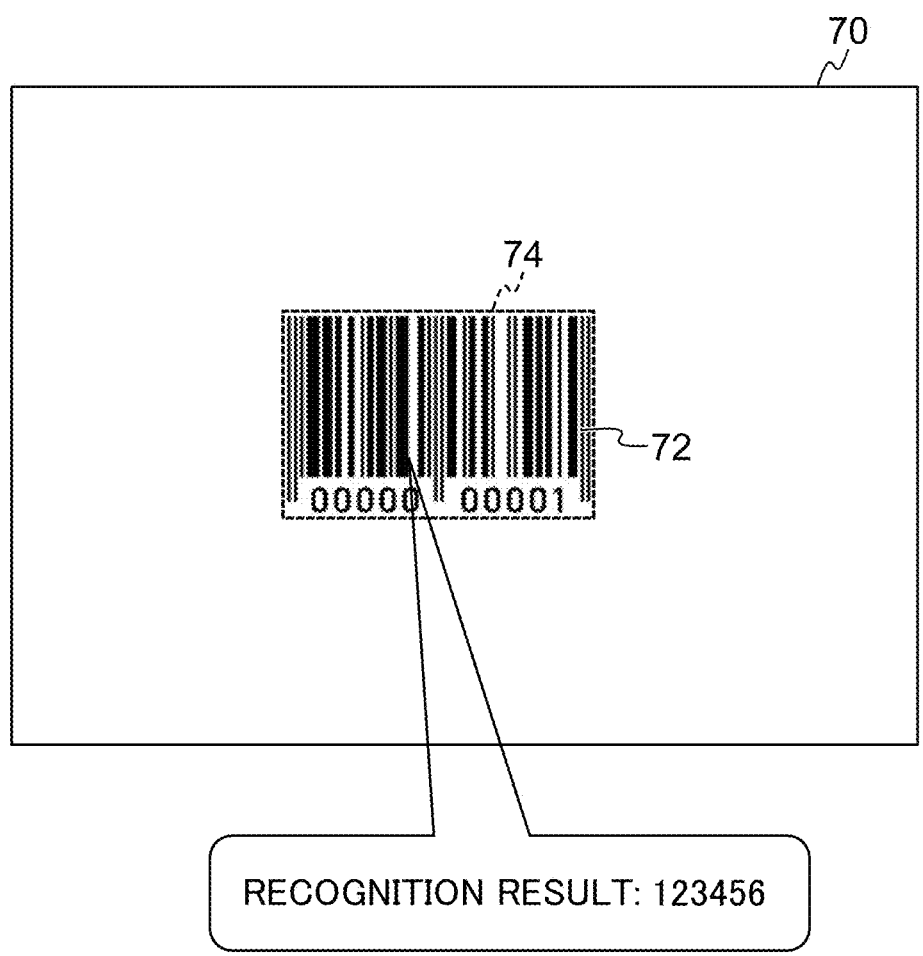
FIG. 2 is a diagram to explain detection and recognition of code information.

The recognition section 12 detects code information from each of plural frames included in the video image data acquired from the camera 30, and recognizes a character string indicated by the code information. A known method may be employed to detect and recognize the code information. For example, as illustrated in FIG. 2, the recognition section 12 detects a rectangular frame 74 surrounding an external profile of code information 72 in each frame 70. The recognition section 12 also recognizes an image within the rectangular frame 74 and acquires a character string therefrom as a recognition result.

The recognition section 12 associates the recognition result for each frame 70 with a frame number of the frame 70, which is then recorded in a record table 80 such as that illustrated in FIG. 3. In the example of the record table 80 illustrated in FIG. 3, a "frame number", "recognition result", "starting character string", "number of characters", "number of consecutive appearances", and "reading result" are recorded associated with each other. Note that the "starting character string", "number of characters", "number of consecutive appearances", and "reading result" will be described later.

In cases in which a worker is performing their primary task, for example receiving or assembling products, without being aware of the code information 72 being read, sometimes the code information 72 may not be detected and recognized due to the code information 72 to be read being partially out of frame, hidden by a hand, in shadow, or the like. Furthermore, a location that does not correspond to the code information 72, such as a hand of the worker or a connector portion captured within the frame 70, may be incorrectly detected as the code information 72.

FIG. 4 illustrates examples of detection results and recognition results for the code information 72 in plural frames 70. In the following explanation, the notation "frame #i" is used to refer to a frame 70 with the $i^{th}$ frame number, as allocated to each of the frames 70 in sequence from a frame 70 at the beginning of the video image data. In the examples in FIG. 4, detection and recognition of the code information 72 is performed correctly for frame #1, frame #4, and frame #5. In frame #2, the hand of a worker is incorrectly detected as the code information 72, and so the recognition result for the code information 72 is also incorrect. In frame #3, the code information 72 is hidden by the hand of a worker captured within the frame 70 such that detection of the code information 72 is unsuccessful, and so a recognition result is not obtained.

In this manner, the recognition results obtained for the plural respective frames 70 include a mixture of correct recognition results and incorrect recognition results.

The determination section 14 therefore determines whether or not a recognition result is valid based on characteristics of the recognition result recognized by the recognition section 12. Specifically, the determination section 14 determines that the recognition result is valid in cases in which at least one of the following scenarios applies. A first scenario is that at least part of the recognition result matches predetermined characters. A second scenario is that the number of characters in the recognition result matches a predetermined number. A third scenario is that the same recognition result has been recognized in two or more consecutive frames 70.

As an example of the first scenario, in cases in which it is known that "abc" is included at the start of a recognition result for the code information 72, the determination section 14 determines that the recognition result is valid in cases in which the start of the recognition result corresponds to "abc". The determination section 14 records "valid" in the "starting character string" field of the record table 80 to indicate that the recognition result is valid when the determination section 14 has determined that the recognition result is valid based on the starting character string. The determination section 14 records "invalid" in the "starling character string" field of the record table 80 to indicate that the recognition result is incorrect in cases in which the determination section 14 determines that the recognition result is invalid based on the starting character string.

As an example of the second scenario, in cases in which it is known that a recognition result for the code information 72 contain five characters, the determination section 14 determines that the recognition result is valid in cases in which the number of characters in the recognition result is five. In cases in which the determination section 14 determines that the recognition result is valid based on the number of characters in the recognition result, the determination section 14 records "valid" in the "number of characters" field of the record table 80. In cases in which the determination section 14 determines that the recognition result is invalid based on the number of characters in the recognition result, the determination section 14 records "invalid" in the "number of characters" field of the record table 80.

As an example of the third scenario, the determination section 14 counts the number of consecutive frames 70 in which each distinct recognition result appears, and records this in the "number of consecutive appearances" field of the record table 80. In cases in which a recognition result that appeared until the preceding frame 70 does not appear in the current frame 70, the determination section 14 clears the count of the number of consecutive appearances. In cases in which in which the count of the number of consecutive appearances has reached "2", for example, the determination section 14 determines that the recognition result is valid. An incorrect recognition result often only occurs temporarily, in one or two consecutive frames, and so for example a value such as two or three may be set as the threshold value for the number of consecutive appearances.

Specific explanation follows employing the examples in FIG. 4. In frame #1, the recognition result "abcde" has been obtained, and so the determination section 14 sets the count of the number of consecutive appearances of the recognition result "abcde" to 1, and records this in the "number of consecutive appearances" field of the record table 80. In frame #2, the recognition result "abdg" has been obtained instead of the recognition result "abcde", and so the determination section 14 records the "number of consecutive appearances" of the recognition result "abdg" as 1, and clears the "number of consecutive appearances" of the recognition result "abcde". In frame #3, no recognition result was obtained, and so the determination section 14 clears the "number of consecutive appearances" of the recognition result "abdg". In frame #4, the recognition result "abcde" has been obtained, and so the determination section 14 records the "number of consecutive appearances" of the recognition result "abcde" as 1. In frame #5, the recognition result "abcde" has been obtained, and so the determination section 14 increments the number of consecutive appearances of the recognition result "abcde" by one, and records the "number of consecutive appearances" of the recognition result "abcde" as 2. The determination section 14 determines that the recognition result "abcde" is valid at this point.

In cases in which the determination section 14 determines that the recognition result of a frame 70 is valid based on at least one out of the above three determination results, the determination section 14 records that recognition result as a candidate for output as a reading result in the "reading result" field of the record table 80. As illustrated by row P tin FIG. 3, the determination section 14 may determine to output a recognition result as a reading result in cases in which the recognition result has been determined to be valid in all three determinations (pattern 1). Alternatively, as illustrated by row Q in FIG. 3, the determination section 14 may determine to output a recognition result as a reading result in cases in which the recognition result has been determined to be valid in any one determination (pattern 2). Alternatively, the determination section 14 may determine to output a recognition result as a reading result in cases in which the recognition result is determined to be valid in any two determinations. Note that when determining whether or not a recognition result is valid based on all three determinations in order to output the recognition result as a reading result, all further determinations may be omitted once any one determination has been determined to be invalid, namely, the recognition has been determined to be incorrect.

The output section 18 employs recognition results determined to be valid by the determination section 14 to output a reading result for the code information 72. Specifically, the output section 18 outputs a final reading result based on reading result candidates recorded in the "reading result" field of the record table 80. In cases in which there are plural distinct candidates present in the "reading result" field, the output section 18 may for example select the candidate that is most frequently recorded in the "reading result" field to be output as the final reading result, or may output all the distinct candidates as final reading results. In cases in which plural distinct candidates are output as reading results, the number of times each candidate has been recorded in the "reading result" field may also be output together with the candidate.

The code information reading device 10 may be implemented by a computer 40 such as that illustrated in FIG. 5. The computer 40 includes a central processing unit (CPU) 41, memory 42 serving as a temporary storage region, and a non-volatile storage section 43. The computer 40 also includes an input/output device 44 for an input section, a display section, and so on, and a read/write (R/W) section 45 that controls reading and writing of data with respect to a storage medium 49. The computer 40 also includes a communication interface (I/F) 46 connected to a network such as the Internet. The CPU 41, the memory 42, the storage section 43, the input/output device 44, the R/W section 45, and the communication I/F 46 are connected to each other through a bus 47.

The storage section 43 is implemented by a hard disk drive (HDD), a solid state drive (SSD), flash memory, or the like. A code information reading program 50 to cause the computer 40 to function as the code information reading device 10 is stored in the storage section 43 serving as a storage medium. The code information reading program 50 includes a recognition process 52, a determination process 54, and an output process 58.

The CPU 41 reads the code information reading program 50 from the storage section 43 for expansion in the memory 42, and executes the processes included in the code information reading program 50 in sequence. By executing the recognition process 52, the CPU 41 acts as the recognition section 12 illustrated in FIG. 1. By executing the determination process 54, the CPU 41 acts as the determination section 14 illustrated in FIG. 1. By executing the output process 58, the CPU 41 acts as the output section 18 illustrated in FIG. 1. Accordingly, the computer 40 functions as the code information reading device 10 by executing the code information reading program 50. Note that the CPU 41 that executes the program corresponds to hardware.

Note that the functions implemented by the code information reading program 50 may for example also be implemented by a semiconductor integrated circuit, and more specifically by an application-specific integrated circuit (ASIC) or the like.

Explanation follows regarding operation of the code information reading device 10 according to the first exemplary embodiment.

Figure 6:
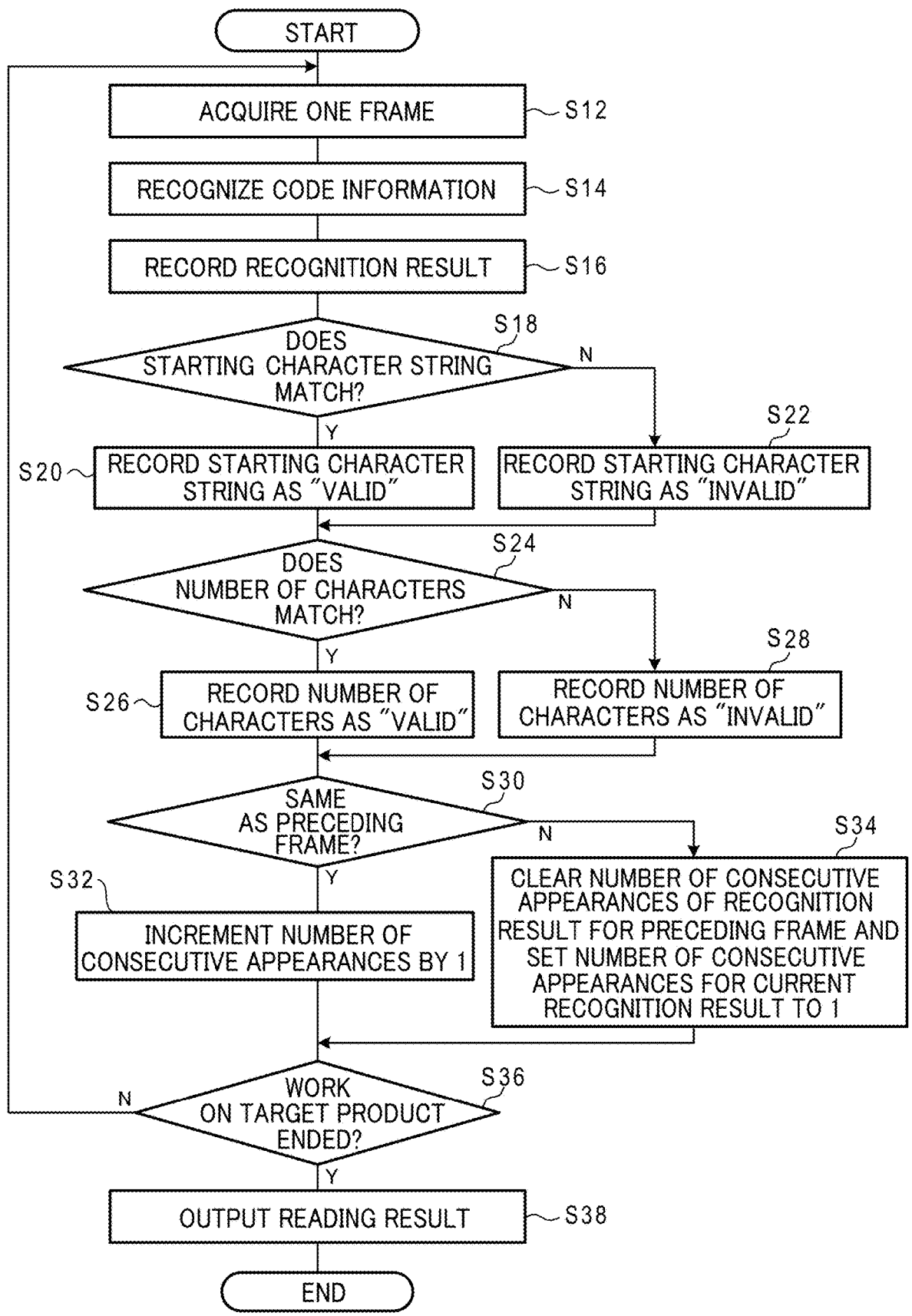
FIG. 6 is a flowchart illustrating an example of code information reading processing according to the first exemplary embodiment.

The code information reading processing illustrated in FIG. 6 is executed by the code information reading device 10 when a signal is input to the code information reading device 10 indicating that work is to start on a work target product, this product being applied with code information 72 such as a bar code or a QR code (registered trademark). The code information reading processing is an example of a code information reading method of the technology disclosed herein.

The above-mentioned signal indicating that work is to start may for example be a signal output by a worker pressing an operation switch when starting work on each product, or may be a signal output from a sensor when the sensor detects that a product conveyed by a conveyor belt or the like has passed a predetermined position. Alternatively, in cases in which frames 70 in which code information 72 has not been detected have continued for a predetermined duration or more (such as one second or more) in the video image data input to the code information reading device 10 from the camera 30, this may be taken to indicate that work on the previous product has ended, and work is to start on the next product.

At step S12 of the code information reading processing illustrated in FIG. 6, the recognition section 12 acquires image data for one frame from the video image data input from the camera 30.

Next, at step S14, the recognition section 12 detects the code information 72 from the frame 70 acquired at step S12, and recognizes the character string indicated by the code information 72.

Next, at step S16, the recognition section 12 associates the recognition result with the frame number, and records this in a record table 80 such as that illustrated in FIG. 3.

For example, as illustrated in FIG. 3, in cases in which the recognition result "abcde" is obtained for frame #1, the recognition section 12 records "1" in the "frame number" field, and "abcde" in the "recognition result" field of the record table 80.

Next, at step S18, the determination section 14 determines whether or not a starting character string of the recognition result matches a predetermined character string. In cases in which the starting character string matches the predetermined character string, processing transitions to step S20, and the determination section 14 records "valid" in the "starting character string" field of the record table 80. In cases in which the staring character string does not match the predetermined character string, processing transitions to step S22, and the determination section 14 records "invalid" in the "starting character string" field.

For example, in cases in which the predetermined character string is "abc", as in the example of the record table 80 illustrated in FIG. 3, the starting character string of the recognition result "abcde" for frame #1 matches the predetermined character string "abc", and so the determination section 14 records "valid" in the "starting character string" field.

Next, at step S24, the determination section 14 determines whether or not the character string of the recognition result matches a predetermined number of characters. In cases in which the number of characters matches the predetermined number of characters, processing transitions to step S26, and the determination section 14 records "valid" in the "number of characters" field of the record table 80. In cases in which the number of characters does not match the predetermined number of characters, processing transitions to step S28, and the determination section 14 records "invalid" in the "number of characters" field.

For example, in cases in which the predetermined number of characters is five, as in the example of the record table 80 illustrated in FIG. 3, the number of characters in the recognition result "abcde" of frame #1 is five, which matches the predetermined number of characters, and so the determination section 14 records "valid" in the "number of characters" field.

Next, at step S30, the determination section 14 determines whether or not the recognition result obtained for the preceding frame 70 and the recognition result recognized at step S14 are the same. In cases in which the recognition results are the same, processing transitions to step S32. In cases in which the recognition results are not the same, processing transitions to step S34.

At step S32, the determination section 14 records a value corresponding to the "number of consecutive appearances" of the preceding frame 70 incremented by 1 in the "number of consecutive appearances" field for the current frame 70, associated with the recognition result. For example, in the example of the record table 80 illustrated in FIG. 3, the same recognition result is obtained for frame #5 as the recognition result "abcde" obtained for the preceding frame #4. Thus, a value of "2", this corresponding to the value "1" recorded in the "number of consecutive appearances" field for frame #4 after being incremented by 1, is recorded in the "number of consecutive appearances" field for frame #5, associated with the recognition result "abcde".

At step S34, the determination section 14 clears the number of consecutive appearances of the recognition result for the preceding frame 70, associates the value 1, as the number of consecutive appearances, with the recognition result for the current frame 70, and records this in the "number of consecutive appearances" field. For example, in the example of the record table 80 illustrated in FIG. 3, the recognition result "abdg" obtained for frame #2 is not the same as the recognition result "abcde" for the preceding frame #1. Thus, the number of consecutive appearances of the recognition result "abcde" for frame #1 is cleared from the "number of consecutive appearances" field for frame #2, and as the number of consecutive appearances, the number 1 is associated with the recognition result "abdg" and recorded in the "number of consecutive appearances" field.

Next, at step S36, the recognition section 12 determines whether or not work on the current work target product has ended. For example, determination that the work has ended may be made in cases in which the worker has pressed an operation switch to indicate that work has ended, or in cases in which a sensor has detected that the work target product has been conveyed, along a conveyor belt or the like and has left the work area. Alternatively, determination that work will start on the next product, namely, that work on the current work target product has ended, may be made in cases in which the previously described signal indicating the start of work is input. In cases in which work on the current work target product has not ended, processing returns to step S12. In cases in which the work has ended, processing transitions to step S38.

At step S38, in cases in which the determination section 14 determines that a recognition result is valid based on the determinations made in steps S18 to S34 above, the determination section 14 records the recognition result in the "reading result" field of the record table 80 as a candidate for output as a reading result.

For example, in the example of the record table 80 illustrated in FIG. 3, a recognition result in which both the "starting character string" and the "number of characters" are "valid", and the "number of consecutive appearances" is 2 or more, is recorded by the determination section 14 in the "reading result" field as a reading result candidate. In cases in which there are no applicable recognition results, the determination section 14 records "N/A" in the "reading result" field. For example, the recognition result "abcde" for frame #5 satisfies all these conditions, and is therefore recorded in the "reading result" field. However, the recognition results "abcde" for frame #1 and frame #4 do not satisfy the condition relating to the number of consecutive appearances, and so "N/A" is recorded as the "reading result". The recognition result "abdg" for frame #2 does not satisfy any of the conditions, and so "N/A" is recorded as the "reading result". Since the recognition result itself is absent in the case of frame #3, "N/A" is recorded as the "reading result".

Alternatively, for example, a recognition result that satisfies at least one condition out of the "starting character string" being "valid", the "number of characters" being "valid", and the "number of consecutive appearances" being 2 or more may be recorded by the determination section 14 in the "reading result" field as a reading result candidate. In this case, unlike the above-described case in which all three conditions need to be satisfied, the recognition results "abcde" for frame #1 and frame #4 satisfy the "starting character string" and the "number of characters" conditions, and are therefore recorded in the corresponding "reading result" fields.

The output section 18 then outputs a final reading result based on the reading result candidates recorded in the "reading result" fields of the record table 80. For example, in the example of the record table 80 illustrated in FIG. 3, the reading result "abcde" is the only candidate recorded in the "reading result" fields, and so "abcde" is output as the final reading result. Although "abdg" was also obtained as another distinct recognition result, this was determined to be an incorrect recognition in the validity determination by the determination section 14 and thereby eliminated, and is therefore not output as a reading result.

The code information reading processing ends when the reading result has been output, and stands by for input of the next signal indicating the start of work. Note that in cases in which the determination of step S36 is performed based on a signal indicating the start of work, processing returns to step S12 after step S38 has ended.

As described above, in the code information reading device according to the first exemplary embodiment, a recognition result including recognized code information is obtained individually for plural frames included in video image data, and determination as to whether or not the recognition result is valid is made based on characteristics of the recognition result. Characteristics of the recognition result include determinations as to whether at least part of the recognition result matches predetermined characters, whether the number of characters in the recognition result matches a predetermined number, and whether the same recognition result is recognized in two or more consecutive frames. A final reading result is output using the recognition results that have been determined to be valid. In cases in which a worker is performing their primary task such as receiving or assembling products without being aware of the code information being read, frames in which the code information is not correctly recognized may occur due to part of the code information to be recognized being temporarily out of range, hidden by a hand, in shadow, or the like. As described above, in the code information reading device according to the first exemplary embodiment, of the recognition results recognized from plural frames of video image data, recognition results that are invalid, namely, incorrectly recognized recognition results, are eliminated, thereby enabling the code information to be accurately read. Namely, a task of consciously reading the code information is not needed, thereby enabling the efficiency of the task of reading the code information applied to work target items to be improved.

Note that although a case in which determination is made as to whether or not the character string at the start of a recognition result matches a predetermined character string is described in the first exemplary embodiment, there is no limitation thereto. For example, determination may be made as to whether or not there is a match to a character string at any specified location of the recognition result, for example whether or not the third to the fifth characters from the start match the character string "cde".

Second Exemplary Embodiment

Explanation follows regarding a second exemplary embodiment. Note that portions of a code information reading device according to the second exemplary embodiment that are similar to those of the code information reading device 10 of the first exemplary embodiment are appended with the same reference numerals, and detailed explanation thereof is omitted.

Figure 7:
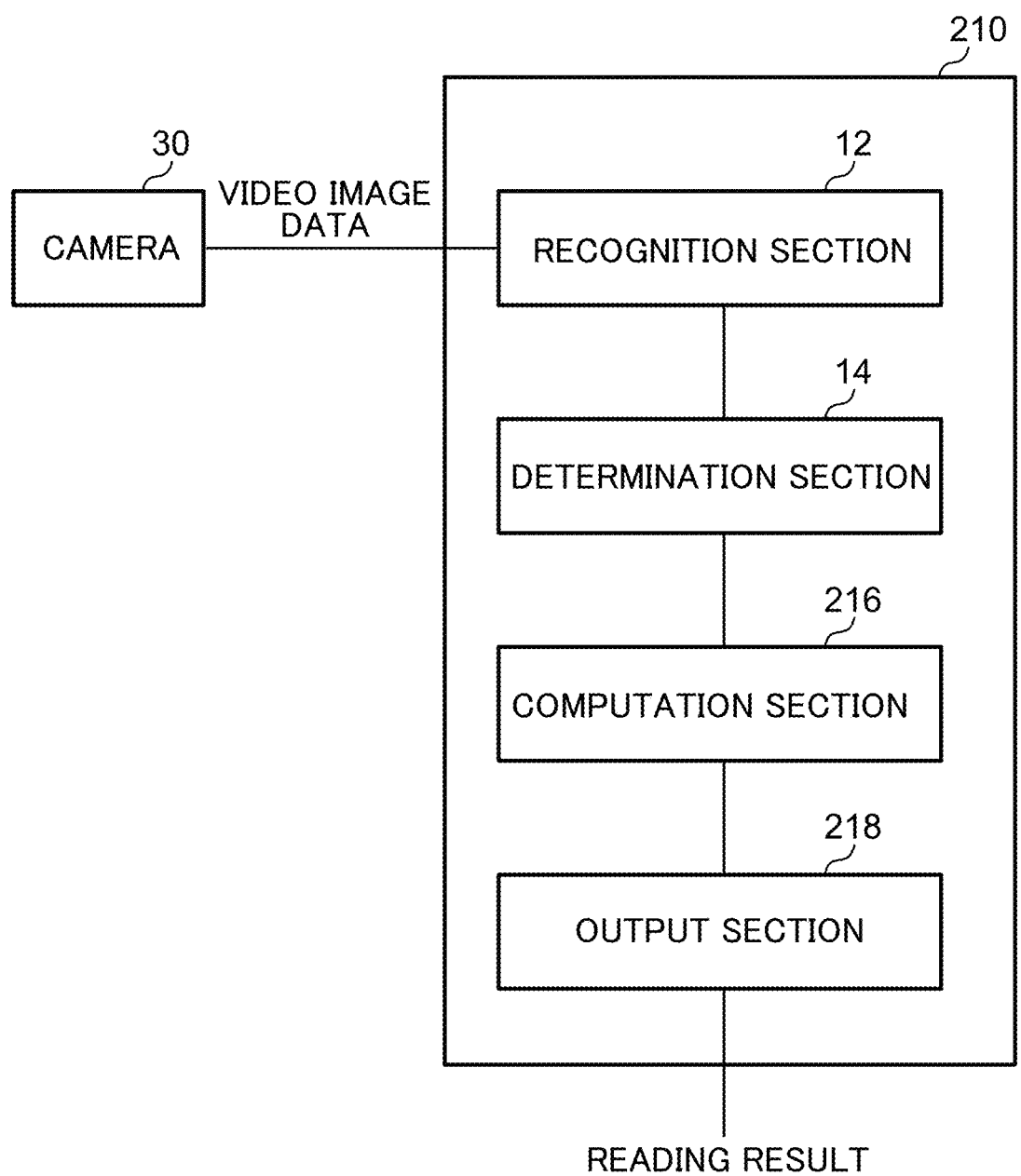
FIG. 7 is a functional block diagram illustrating a code information reading device according to a second exemplary embodiment.

As illustrated in FIG. 7, in terms of functionality, a code information reading device 210 according to the second exemplary embodiment includes the recognition section 12, the determination section 14, a computation section 216, and an output section 218.

The computation section 216 computes a statistical degree of confidence in the recognition result for each recognition result that has been determined to be valid by the determination section 14, namely, for each distinct reading result candidate. For example, as the degree of confidence in each candidate, for plural frames 70 included in video image data corresponding to a predetermined duration, the computation section 216 computes the frequency of appearance of each distinct reading result candidate with respect to the number of frames for which a reading result candidate has been obtained. Note that the predetermined duration may for example be a duration spanning from the start to finish of work on a single product.

FIG. 8 illustrates examples of detection results and recognition results for code information 72 for plural frames 70. In the example, in FIG. 8, detection and recognition of the code information 72 is correctly performed for frame #4 and frame #5. However, incorrect partial detection of the code information 72 is made for frame #1 and frame #3, and so the recognition result for the code information 72 is also incorrect. Furthermore, the hand of a worker has been captured within the frame 70 in frame #2 such that detection of the code information 72 is unsuccessful, and a recognition result is not obtained.

FIG. 9 illustrates an example of a record table 280 in which the recognition results and determination results of the examples in FIG. 8 are recorded. Note that explanation follows regarding a case in which recognition results which the determination section 14 has determined to be valid in all three determinations are set as reading result candidates (pattern 1). In this case, the number of frames for which a reading result candidate has been obtained is one, with only "abcde" having been obtained (once) as a distinct reading result candidate. Thus, as illustrated by row P in FIG. 9, the computation section 216 computes the degree of confidence in the candidate "abcde" to be "1/1" (100%).

Suppose the degree of confidence were to be computed based on the number of appearances of each recognition result as illustrated by row Q in FIG. 9, without the determination section 14 performing determination regarding the validity of the recognition result. In such a case, the incorrect recognition result "abdg" would not be eliminated, and would be obtained the same number of times as the correct recognition result "abcde". Thus, the degree of confidence in the incorrect recognition result "abdg" would be computed as "2/4" (50%), this being the same as that of the correct recognition result "abcde".

In the present exemplary embodiment, the statistical degree of confidence in each recognition result (each reading result candidate) is computed after incorrect recognition has been eliminated by the determination section 14, thereby enabling the degree of confidence to be accurately computed.

Note that the computation section 216 may compute the degree of confidence in each distinct reading result candidate each time a recognition result is obtained for a frame 70. In such a case, the computation section 216 computes the degree of confidence in each distinct candidate based on the number of frames for which a recognition result has been obtained up to the current frame 70, and the number of appearances of each distinct reading result candidate. The computation section 216 then records the computed degree of confidence in each distinct candidate in the "degree of confidence" field corresponding to the relevant "frame number" in the record table 280.

The output section 218 outputs a final reading result based on the degree of confidence in each reading result candidate. For example, the output section 218 may output the candidate that has the highest degree of confidence as the final reading result. Alternatively, the output section 218 may associate a value representing the degree of confidence with each candidate, and output these values with the final reading results.

Figure 10:
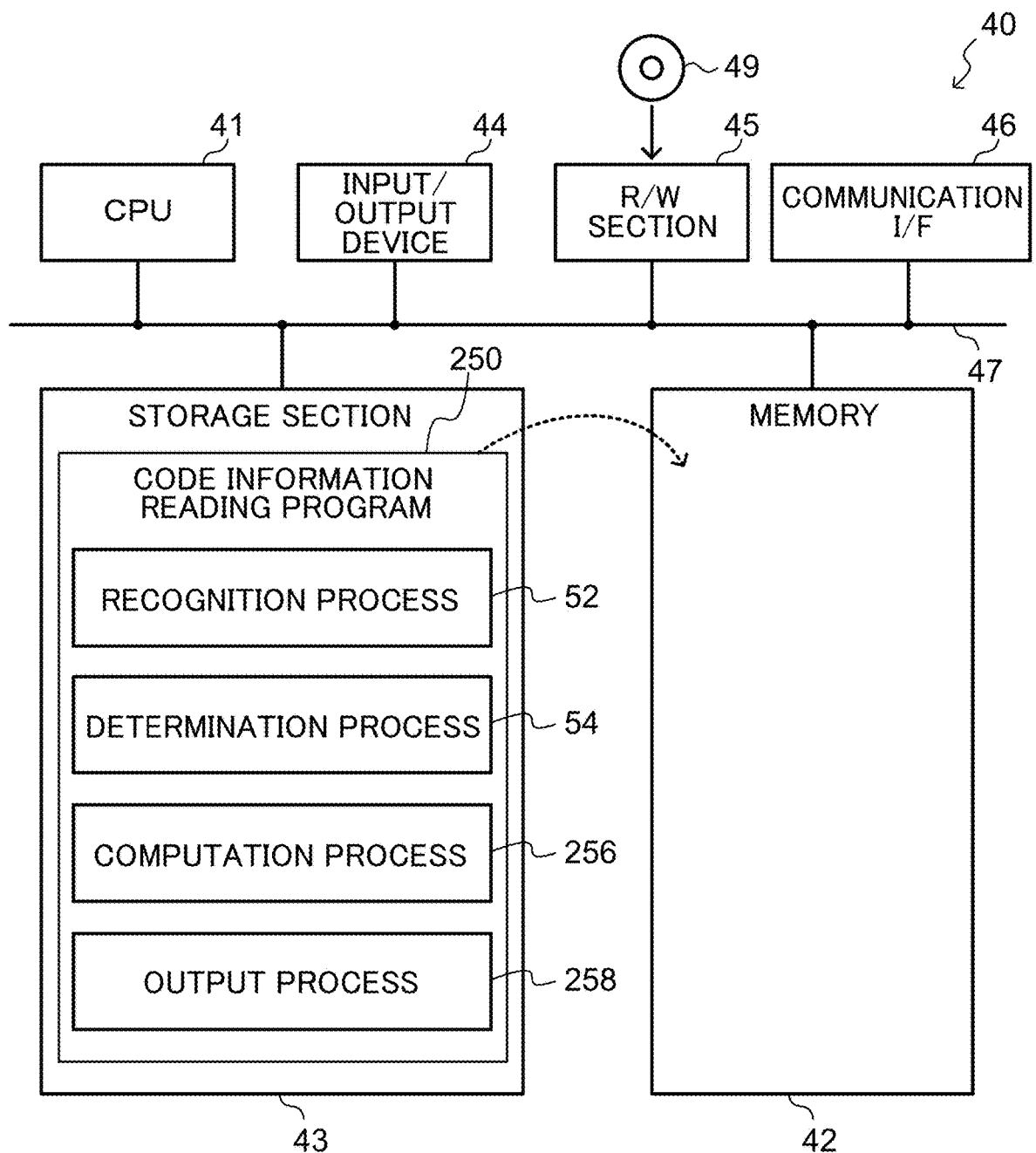
FIG. 10 is a block diagram illustrating a schematic configuration of a computer functioning as a code information reading device according to the second exemplary embodiment.

The code information reading device 210 may for example be implemented by the computer 40 illustrated in FIG. 10. A code information reading program 250 to cause the computer 40 to function as the code information reading device 210 is stored in the storage section 43 serving as a storage medium. The code information reading program 250 includes the recognition process 52, the determination process 54, a computation process 256, and an output process 258.

The CPU 41 reads the coda; information reading program 250 from the storage section 43 for expansion in the memory 42, and executes the processes included in the code information reading program 250 in sequence. By executing the computation process 256, the CPU 41 acts as the computation section 216 illustrated in FIG. 7. By executing the output process 258, the CPU 41 acts as the output section 218 illustrated in FIG. 7. The other processes are similar to those in the code information reading program 50 according to the first exemplary embodiment. Accordingly, by executing the code information reading program 250, the computer 40 functions as the code information reading device 210.

Note that the functions implemented by the code information reading program 250 may for example also be implemented by a semiconductor integrated circuit, and more specifically by an ASIC or the like.

Explanation follows regarding operation of the code information reading device 210 according to the second exemplary embodiment. In the second exemplary embodiment, the code information reading processing illustrated in FIG. 11 is executed in the code information reading device 210. Note the processing in the code information reading processing of the second exemplary embodiment that is similar to that in the code information reading processing of the first exemplary embodiment is appended with the same reference numerals, and detailed explanation thereof is omitted.

After the recognition results have been recorded in the record table 280 in steps S12 to S16, processing transitions to step S40, and determination processing is executed. The determination processing is similar to steps S18 to S34 of the code information reading processing of the first exemplary embodiment (FIG. 6).

When the determination processing has ended, processing transitions to step S36 similarly to in the first exemplary embodiment.

Next, at step S238, the computation section 216 computes the statistical degree of confidence in each recognition result out of the recognition results that have been determined to be valid by the determination section 14, namely, for each distinct reading result candidate. For example, in the example of FIG. 9, the number of frames where a reading result candidate has been obtained is one and the candidate "abcde" has been recorded once, and so the degree of confidence in the candidate "abcde" is computed to be "1/1" (100%).

The output section 218 then outputs a final reading result based on the degree of confidence each reading result candidate. In the above example, the candidate "abcde" is output as the final reading result. This code information reading processing then ends.

As explained above, in the code information reading device according to the second exemplary embodiment, the validity of each distinct recognition result recognized from plural frames is determined based on its characteristics, and incorrect recognition results are eliminated before computing the degree of confidence in each recognition result by statistical processing. In addition to similar advantageous effects to those of the first exemplary embodiment, this enables more appropriate reading results to be output based on the accurately computed degree of confidence.

Note that although a case in which the degree of confidence is computed based on the frequency of appearance of each distinct recognition result with respect to the number of frames for which recognition results have been obtained has been described in the second exemplary embodiment, there is no limitation thereto. For example, the degree of confidence may be computed based on the frequency of appearance of each distinct recognition result with respect to the overall number of frames obtained within a predetermined duration.

Although a bar code has been illustrated as an example of the code information in the above exemplary embodiments, similar application may be made in the case of a QR code (registered trademark).

Although a format in which a code information reading program is pre-stored (installed) in a storage section has been described in the above exemplary embodiments, there is no limitation thereto. The program according to the technology disclosed herein may be provided in a format stored in a storage medium such as CD-ROM, DVD-ROM, or USB memory.

However, on an assembly line where many workers are working, or at a site where products are being received or shipped, it is difficult to maintain such a state at the timing of image capture while the workers are performing their primary tasks without being aware that the bar code or QR, code (registered trademark) is being read.

An aspect of technology disclosed herein exhibits the advantageous effect of enabling the efficiency of a task to read code information applied to a work target to be improved.

All cited documents, patent applications, and technical standards mentioned in the present specification are incorporated by reference in the present specification to the same extent as if each individual cited document, patent application, or technical standard was specifically and individually indicated to be incorporated by reference.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention, Although one or more embodiments of the present invention have been described in detail, it should be understood that the various changes, substitutions, and alterations could be made hereto without departing from the spirit and scope of the invention.

What is claimed is:

1. A code information reading device comprising:
   a memory; and
   a processor that is connected to the memory and that executes:
      a detection processing that detects code information from each of plural frames included in video image data and to recognize at least one character string indicated by the code information;
      a first validity determination processing that determines that the recognized at least one character string is valid when all of a first condition, a second condition and a third condition are valid, wherein when any one of the first condition, the second condition, or the third condition has been determined invalid, all further determination with respect to other conditions are omitted, the first condition being a scenario in which at least part of the recognized at least one character string matches a predetermined character, the second condition being a scenario, the second condition being a scenario in which a number of characters in the recognized at least one character string matches a predetermined number, and the third condition being a scenario in which the same recognized at least one character string is recognized in two or more consecutive frames;
      a second validity determination processing that, after the processor executes the first validity determination processing, extracts final character string from the recognized at least one character string that has been determined as valid based on a statistical degree of confidence in the recognized at least one character string for each distinct recognized at least one character string determined to be valid, wherein, as the degree of confidence in the recognized at least one character string, a frequency of appearance of each of the distinct recognized at least one character string with respect to a number of frames, out of the total number of plural frames, for which a recognized at least one character string determined to be valid has been obtained; and
      an output processing that, based on the result of the second validity determination processing, outputs the final character string as a reading result.

2. The code information reading device of claim 1, wherein the statistical quantity is a number of consecutive appearances corresponding to a number of consecutive frames in which the recognized at least one character string that has been determined as valid appears.

3. A code information reading method in which a computer executes processing, the processing including:
   by a processor:
      detecting code information from each of plural frames included in video image data and to recognize at least one character string indicated by the code information;
      a first validity determining that the recognized at least one character string is valid when all of a first condition, a second condition and a third condition are valid, wherein when any one of the first condition, the second condition, or the third condition has been determined invalid, all further determination with respect to other conditions are omitted, the first condition being a scenario in which at least part of the recognized at least one character string matches a predetermined character, the second condition being a scenario, the second condition being a scenario in which a number of characters in the recognized at least one character string matches a predetermined number, and the third condition being a scenario in which the same recognized at least one character string is recognized in two or more consecutive frames;
      a second validity determining that, after the processor executes the first validity determination processing, extracts final character string from the recognized at least one character string that has been determined as valid based on a statistical degree of confidence in the recognized at least one character string for each distinct recognized at least one character string determined to be valid, wherein, as the degree of confidence in the recognized at least one character string, a frequency of appearance of each of the distinct recognized at least one character string with respect to a number of frames, out of the total number of plural frames, for which a recognized at least one character string determined to be valid has been obtained; and
      outputting, based on the result of the second validity determination processing, outputs the final character string as a reading result.

4. The code information reading method of claim 3, wherein the statistical quantity is a number of consecutive appearances corresponding to a number of consecutive frames in which the recognized at least one character string that has been determined as valid appears.

5. A non-transitory computer-readable storage medium storing a code information reading program to cause a computer to execute processing, the processing including:
   detecting code information from each of plural frames included in video image data and to recognize at least one character string indicated by the code information;
   a first validity determining that the recognized at least one character string is valid when all of a first condition, a second condition and a third condition are valid, wherein when any one of the first condition, the second condition, or the third condition has been determined invalid, all further determination with respect to other conditions are omitted, the first condition being a scenario in which at least part of the recognized at least one character string matches a predetermined character, the second condition being a scenario, the second condition being a scenario in which a number of characters in the recognized at least one character string matches a predetermined number, and the third condition being a scenario in which the same recognized at least one character string is recognized in two or more consecutive frames;
   a second validity determining that, after the processor executes the first validity determination processing, extracts final character string from the recognized at least one character string that has been determined as valid based on a statistical degree of confidence in the recognized at least one character string for each distinct recognized at least one character string determined to be valid, wherein, as the degree of confidence in the recognized at least one character string, a frequency of appearance of each of the distinct recognized at least one character string with respect to a number of frames, out of the total number of plural frames, for which a recognized at least one character string determined to be valid has been obtained; and outputting, based on the result of the second validity determination processing, outputs the final character string as a reading result.

6. The non-transitory computer-readable storage medium of claim 5, wherein the statistical quantity is a number of consecutive appearances corresponding to a number of consecutive frames in which the recognized at least one character string that has been determined as valid appears.

* * * * *